Aug. 16, 1938.　　　A. S. CAMBRIDGE　　　2,127,053
MOWING MACHINE
Filed June 19, 1937
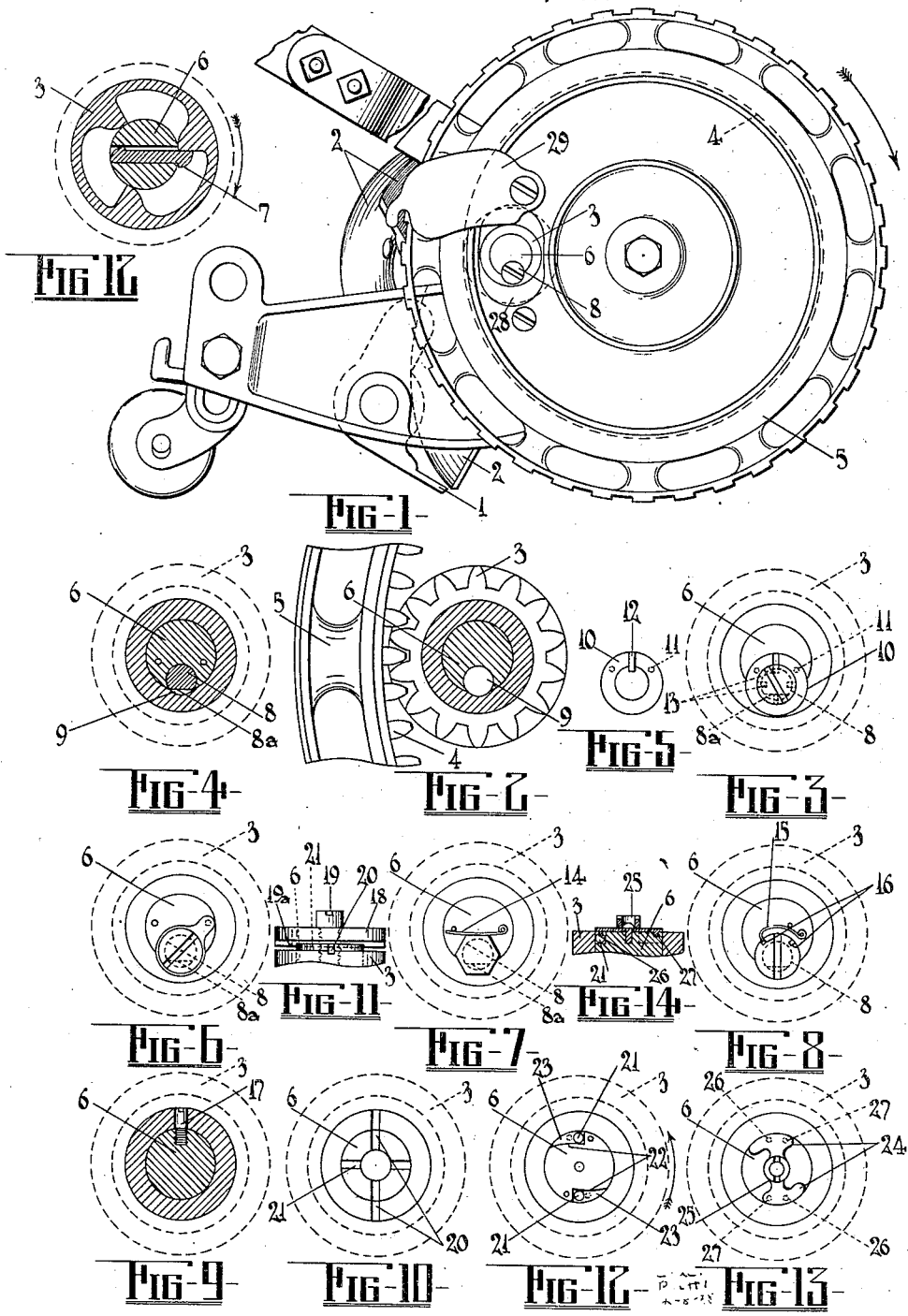

Patented Aug. 16, 1938

2,127,053

UNITED STATES PATENT OFFICE 2,127,053

MOWING MACHINE

Allan Steward Cambridge, Dalrachney Station, Omarama, New Zealand

Application June 19, 1937, Serial No. 149,259
In New Zealand May 3, 1937

2 Claims. (Cl. 287—52.09)

The invention relates to mowing machines of the type provided with a rotary cutter operable about an axis parallel to, and in conjunction with, a horizontal fixed cutter bar, mounted to travel along the ground a short distance above the surface thereof.

In mowing machines of this type, it is the usual practice to provide gearing between the rotary cutter spindle and the running wheels of the machine for operating the rotary cutter, said gearing including a driving wheel on each end of the rotary cutter spindle, and one way driving gear fitted between the latter and the wheels thereon, so that the rotary cutter is operated to function as such only upon forward movement of the machine, said rotary cutter remaining inoperative during rearward movement of the machine.

It is also known in connection with said machines, to provide the correct edges on the blades of the rotary cutter and the fixed cutter bar, to ensure efficient operation of the machine, by placing a grinding material on the fixed cutter bar, and reversing the direction of travel of the rotary cutter in relation to said cutter bar and so grind the blades of the rotary cutter into true and correct relationship with the fixed cutter bar.

The carrying out of the last mentioned operation entails however, the removal of the running wheels of the machine, the reversal and the transfer of the geared driving wheels from end to end on the rotary cutter spindle, and the replacement of the running wheels, following which the machine can be operated, to cause the rotary cutter to be driven in a direction the reverse to that in which it travels when operating normally to perform its cutting operation.

The object of the invention, is to provide an improvement in mowing machines of the type specified, whereby dismantling of the machine, removal and replacement of parts, with the consequent loss of time, liability to lose, misplace and incorrectly adjust parts, are all avoided, and so that by means of a simple adjustment, the provision of the means for the carrying out of which entails only a trifling expense, the rotary cutter can be caused to travel in either direction according to whether the blade edges are to be dealt with for correct setting, or to operate in the usual way to perform the cutting operation.

According to the invention, a mowing machine fitted with the improvement, is provided with a rotary cutter; a fixed cutter bar with which the latter co-operates; a geared wheel on the rotary cutter spindle; one way drive gear between the latter and the geared wheel thereon for drivably connecting said wheel with said spindle to drive the rotary cutter so that it co-operates with the fixed cutter bar to perform a cutting operation; and reverse action gear fitted to said wheel and said spindle, so as to be capable of being brought into use to enable reverse turning movement to be given to the rotary cutter.

The invention will be more particularly described in conjunction with the accompanying drawing wherein are illustrated in particular various ways of applying the reverse action gear to a mowing machine of the type referred to.

In the drawing:

Figure 1 is a side view of a mowing machine illustrating the reverse action gear in its simplest form, and Figure 2 is a detail view partly in section, with the locking pin used in Figure 1 removed, Figures 3 and 4 are an elevation and a sectional elevation respectively, illustrating the reverse action gear in an alternative form, while Figure 5 is a view of the spring washer and retainer used in the form shown in Figures 3 and 4, Figures 6 to 9 are elevations and a sectional view showing further ways of fitting the reverse action gear, Figures 10 and 11 are an elevation and a plan view respectively showing a form of the reverse action gear in which a clamping plate is used, Figure 12 is a sectional view showing the one way drive gear through which movement is given to the rotary cutter to perform a cutting operation.

In the drawing, I represents the usual fixed cutter bar with which the blades of the rotary cutter 2 co-operate to perform the cutting operation when they travel in the direction indicated by the arrow, upon the machine being moved forward, the requisite turning movement of the rotary cutter 2 in a direction forwardly of the machine being imparted to said cutter through a geared wheel 3, on the cutter spindle 6, said wheel 3, for the purpose of illustration only, being shown as a pinion meshing with an internal circular toothed rack 4 formed integral with a running wheel 5 of the machine.

The means for drivably connecting the wheel 3 with the spindle 6, so as to turn the cutter 2 forwards or in the direction in which it will co-operate with the fixed cutter bar 1 to perform a cutting operation, comprise a one way drive or ratchet gear 7 (Figure 12), interposed between the wheel 3 and the spindle 6, said gear 7 permitting the wheel 3 to be turned backwards without turning the spindle 6, which is desirable during normal or ordinary mowing operations of the machine.

When however, it is desired to adjust or grind the edges of the blades of the cutter 2, for the purpose referred to in the opening paragraphs hereof, by causing said blades to travel across the fixed cutter bar 1 from the rear to the front thereof, or in the reverse direction to which they travel when performing a cutting operation, it is necessary to provide means whereby the wheel 3 can be drivably connected with the spindle 6 when said wheel turns backwards of the machine about its own axis, and this driving connection may be effected or carried out by the provision of reverse action gear which, as illustrated in Figures 1 to 8 of the drawing, can comprise a pin 8 inserted in a hole 9 formed partly in the spindle 6 and partly in the wheel 3, so as to lock or key the latter to the spindle 6, said hole 9 and the pin 8 preferably being screw threaded to ensure the latter remaining in the hole 9 when required.

In its simplest form the pin 8 can consist of screw with a slotted head and capable of being placed in or removed from the hole 9 as required, but when it is desired that said pin 8 shall remain permanently in the hole 9, it is formed with a flat side 8a or is otherwise shaped in order that it may be positioned in the hole 9 so as not to project into the wheel 3 (Figure 4), and so leave the latter free to turn without turning the spindle 6, locking of the wheel 3 to the latter being effected by turning the pin 8 in the hole 9, so that it extends into both the wheel 3 and the spindle 6.

Means for preventing the pin 8 from turning in the hole 9, under vibration, when left therein, can comprise a spring washer 10 (Figures 3, 4, 5) placed on said pin 8 behind its head, and held against turning movement on the pin 8 by projections 11 entered in holes or recesses in the end of the spindle 6, said washer 10 having thereon a projection 12, on which are adapted to engage one of a plurality of recesses 13 in the under side of the head of the pin 8, one of the recesses 13 being positioned so that when engaged with the projection 12 from the washer 10, the pin 8 does not extend into the wheel 3 leaving same free to rotate without turning the spindle 6, but when any one of the remaining recesses 13 is engaged with the projection 12, the pin 8 locks the wheel 3 to the spindle 6.

In the form shown in Figure 7, the pin 8 is provided with a head having a plurality of flat sides against which a flat spring 14 secured on the spindle 6 bears, and prevents the pin 8 from turning under vibration, but past which the flat sides may be forced, to permit the pin 8 to be positioned in the hole 9 as required, while in the form illustrated in Figure 8, a spring 15 secured on the spindle 6, can be caused to enter one of a plurality of recesses 16 in the side of the head of the pin 8, to retain same in a selected position.

In a further form the wheel 3 can be locked to the spindle 6, by a pin or screw 17 passed through a boss on the wheel 3 and into or through the spindle 6 (Figure 9).

The means illustrated in Figures 10 and 11 for drivably connecting the wheel 3 to the spindle 6, so as to obtain the reverse turning movement of the latter and the rotary cutter 2, comprise a plate 18 adapted to be held on the spindle 6, by a central screw 19, and formed with ribs 19a adapted to be entered in recesses 20 in the spindle 6 and wheel 3, upon said recesses being brought into alignment with each other, and following tightening of the screw 19, the plate 18 locks the wheel 3 to the spindle 6.

In order to permit the plate 18 to be adjusted and held clear of the wheel 3 when it is desired that the latter shall rotate without driving the spindle 6, the latter is made to project slightly beyond the wheel 3, and contains shallow recesses 21 at right angles to the recesses 20 in the spindle 6, so that by loosening the screw 19 sufficiently and giving the plate 18 a quarter turn thereon, the latter may be positioned and positively locked on the spindle 6 with its ribs 19a clear of the wheel 3, leaving the latter free to rotate without turning the spindle 6.

What I do claim and desire to obtain by Letters Patent of the United States of America is:—

1. A reel shaft locking mechanism for use in a lawn mower comprising, a reel spindle, a gear wheel rotatably mounted on the spindle adjacent one end thereof, said spindle having a threaded opening extending inwardly from the end thereof, said gear wheel having a threaded groove formed in the inner surface thereof so that when the groove is circumferentially positioned adjacent the opening in the shaft a cylindrical threaded hole is provided extending inwardly from the end of the shaft, a flat-sided threaded pin arranged in the opening provided in said spindle with the flat side positioned towards the gear wheel so that the gear wheel may rotate freely on the spindle, a head carried by said pin whereby the pin may be turned from the end of the reel spindle to cause the arcuate periphery thereof to extend into the groove and lock the gear wheel on the reel spindle, and means associated with the head of the pin for maintaining the pin in a given rotated position.

2. A reel shaft locking mechanism for use on a lawn mower comprising, a reel spindle, a gear wheel rotatably mounted on the spindle adjacent one end thereof, said spindle extending slightly beyond the hub portion of the gear wheel and having a threaded opening extending inwardly from the end thereof, said gear wheel having a threaded groove formed in the inner surface thereof so that when the groove is positioned adjacent the opening in the shaft a cylindrical threaded hole is provided extending inwardly from the end of the shaft and the gear wheel, a flat-sided threaded pin having a head thereon arranged in the opening provided in said spindle with the flat side positioned towards the gear wheel when the head is drawn against the end of the spindle so that the gear may rotate freely upon the spindle whereby the pin may be turned to loosen the head from the end of the spindle and cause the arcuate periphery of the pin to extend into the groove and lock the gear wheel on the reel spindle.

ALLAN STEWARD CAMBRIDGE.

CERTIFICATE OF CORRECTION.

Patent No. 2,127,053.   August 16, 1938.

ALLAN STEWARD CAMBRIDGE.

It is hereby certified that error appears in the above numbered patent requiring correction as follows: The present drawing should be canceled and the drawing containing twelve figures as shown below should be inserted therefor as a part of the Letters Patent – ug. 16, 1938.   A. S. CAMBRIDGE   2,127,053

MOWING MACHINE

Filed June 19, 1937

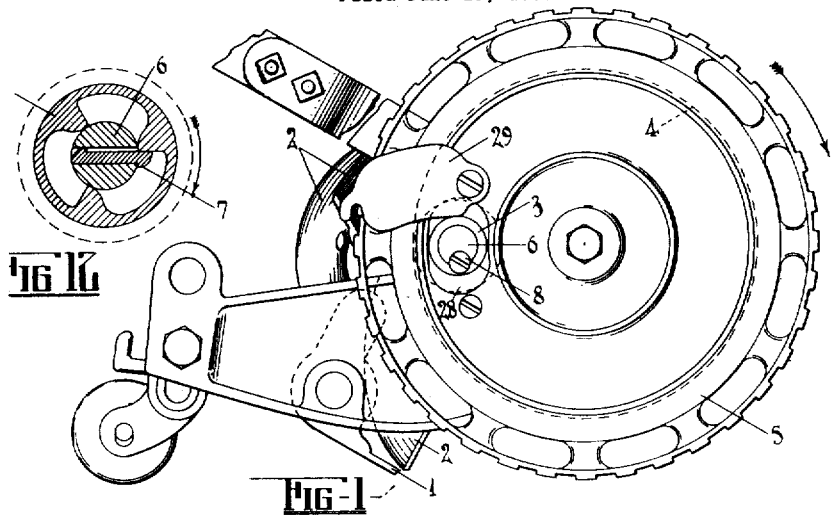

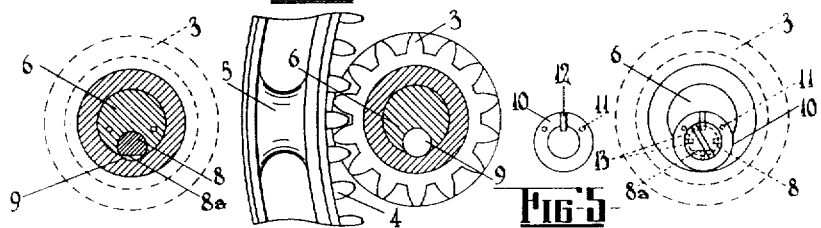

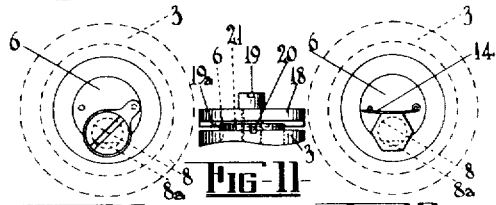
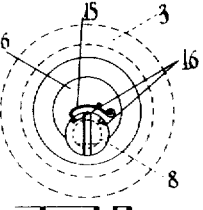

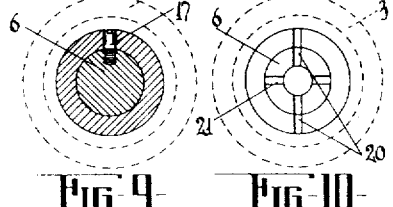

A. S. Cambridge
  Inventor
By Glascock Downing Heebs
  Attys and that the said Letters Patent should be read with this correction therein that the same may conform to the record of the case in the Patent Office.

Signed and sealed this 13th day of September, A. D. 1938.

Henry Van Arsdale